May 8, 1951     A. G. EVERHART     2,551,589
DIRECTION FINDER CIRCUIT

Filed July 16, 1946     3 Sheets-Sheet 1

INVENTOR.
ARBOR G. EVERHART
BY
ATTORNEY

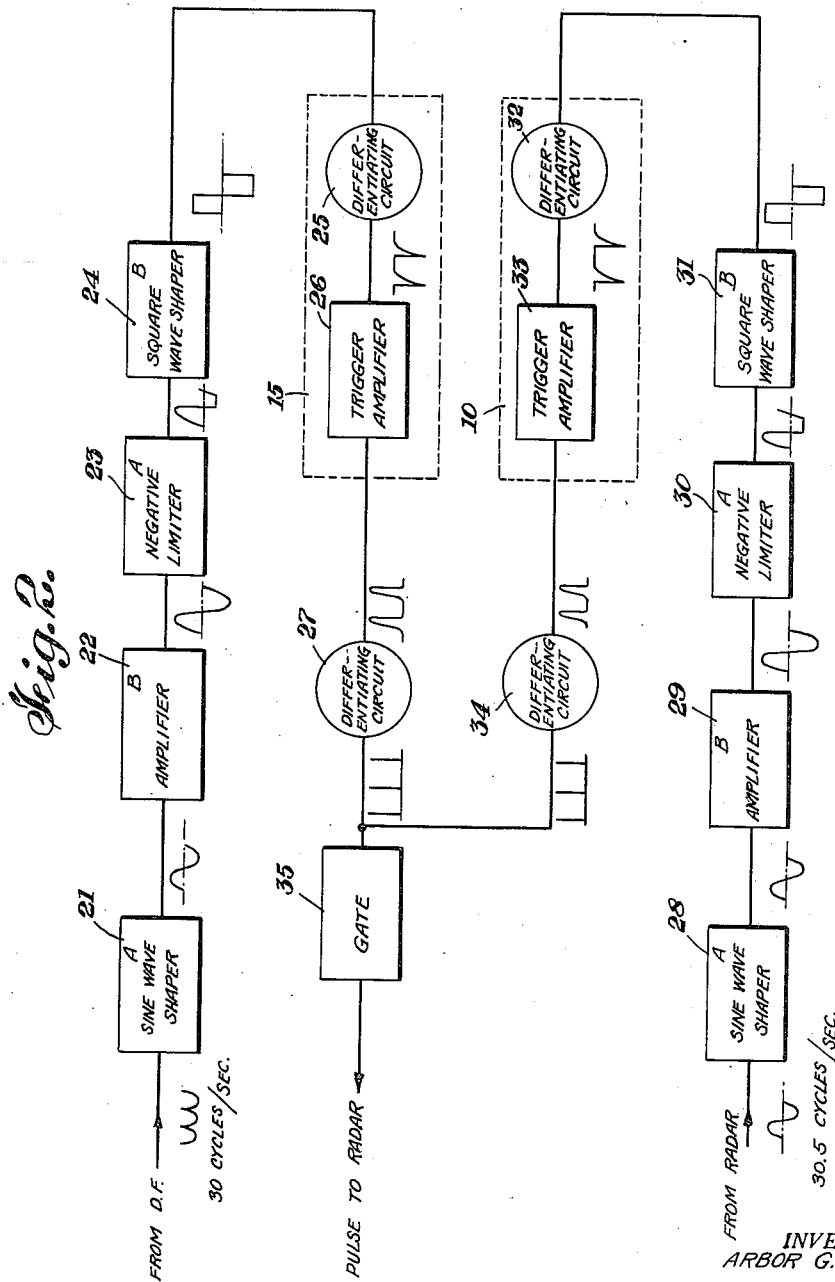

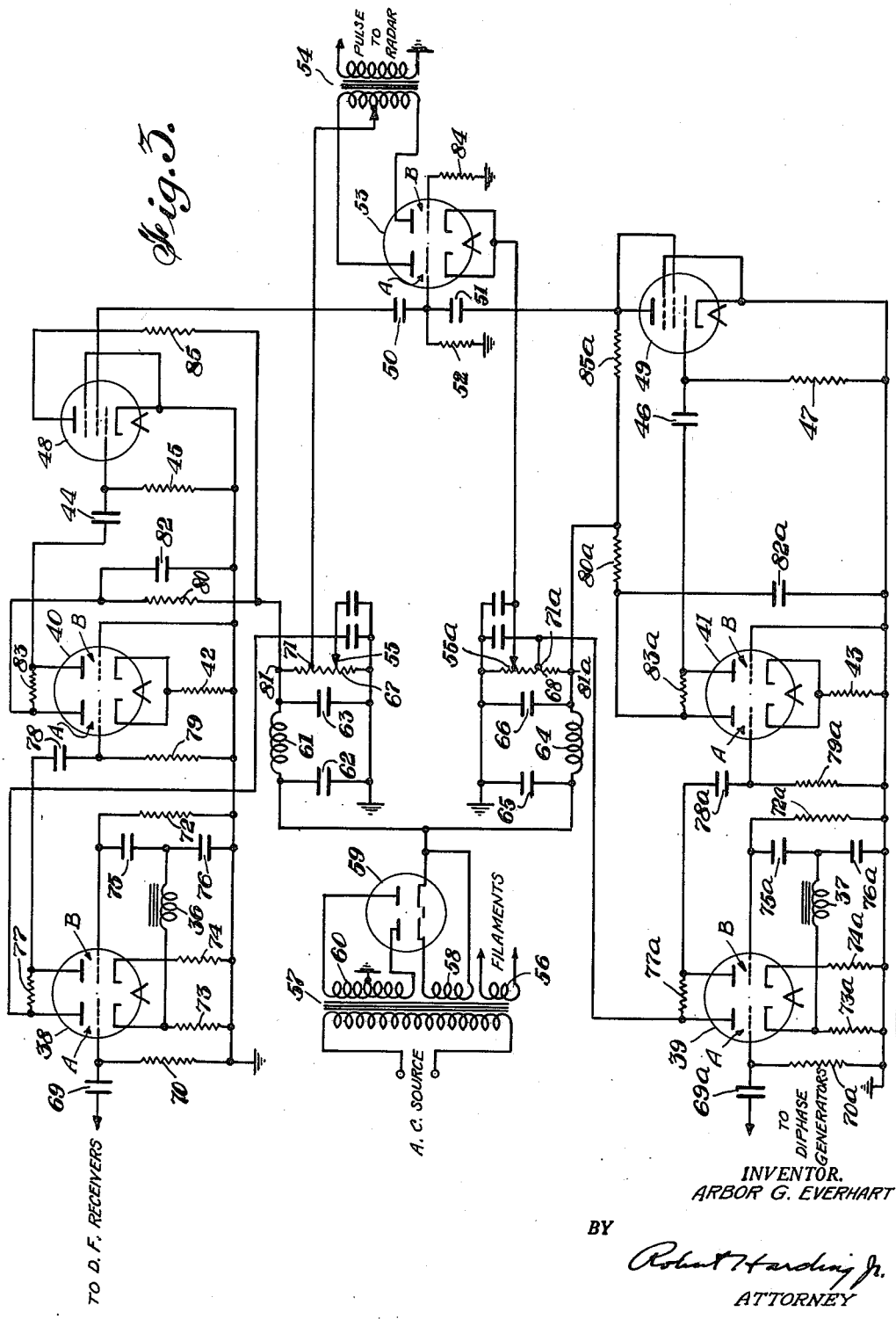

Patented May 8, 1951

2,551,589

UNITED STATES PATENT OFFICE 2,551,589

DIRECTION FINDER CIRCUIT

Arbor Gordon Everhart, Great River, N. Y., assignor to Federal Telephone and Radio Corporation, New York, N. Y., a corporation of Delaware Application July 16, 1946, Serial No. 684,007

21 Claims. (Cl. 343—6)

This invention relates to direction finder circuits and particularly such circuits used in conjunction with radar systems.

An object of the invention is to provide a brightening indication for a rotatable radar system used in conjunction with a rotatable direction finding system at times when the two systems have certain angular rotation positions with respect to some fixed direction.

Another object is to provide such brightening indication at such times irrespective of the rotation speeds of each of the two systems.

Another object of the circuit is to provide a means for aircraft detection and identification wherein a rotatable direction finding system and a rotatable radar system are used in conjunction whereby the necessity for synchronizing the rotations of the two systems is avoided.

Additional objects are to provide in such a circuit particular adaptability to the production of the brightening indication and to obtain accuracy with respect to time of the production of the indication.

Previously, in rotatable direction-finding systems used in conjunction with rotatable radar systems, it has been necessary to synchronize the rotation speeds of the two systems in some manner in order that the direction finding system and the radar system should each always bear a certain angular rotational position with respect to some fixed direction.

The necessity for this synchronization has made it difficult to separate physically the direction finding system from the radar system without decreasing the accuracy of synchronization upon which the correct operation of the systems depends. These difficulties have been avoided by the present invention which possesses several advantages such as freedom from the requirement for synchronizing the direction finder system with the radar system, freedom of choice of physically separate locations for the two systems, and other advantages which will be pointed out in the following detailed description and illustrative drawings in which:

Fig. 2 shows a block diagram of the elements of the embodiment of the invention shown in Fig. 1, including wave-forms at various points among these elements; and Fig. 3 shows a possible schematic diagram of the block diagram shown in Fig. 2.

Figure 1:
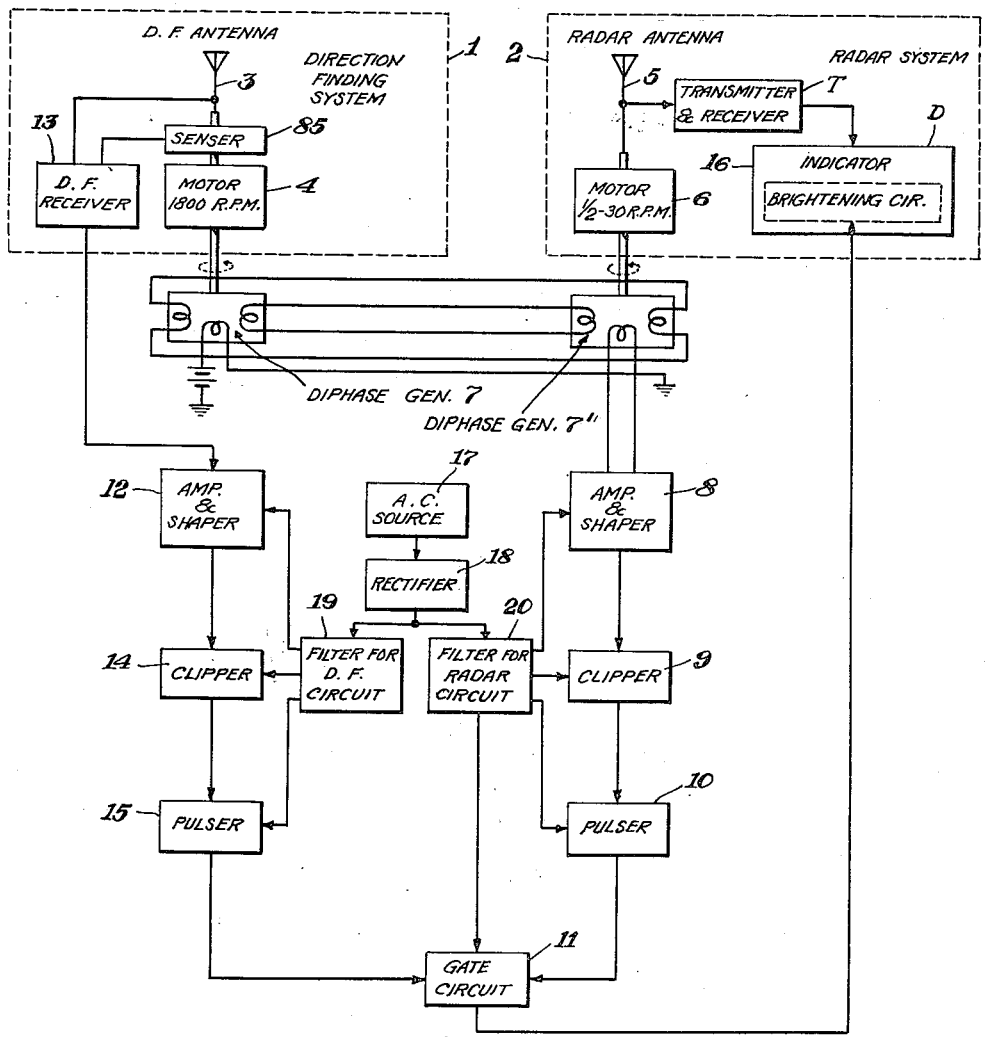
Fig. 1 is a block diagram showing one circuit embodiment of the invention.

Fig. 1 which is a block diagram intended only to illustrate the principle of operation of one embodiment of the invention, shows a rotatable direction finding system 1 and a rotatable radar system 2 including a transmitter and receiver T and an indicator D. The antenna 3 of the direction finding system is rotated by a motor 4 at some constant speed such as 1800 R. P. M. and the antenna 5 of the radar system is rotated by a motor 6 at a variable speed adjustable in some range of speed such as ½ to 30 R. P. M. It is desired to obtain a brightening indication in the brightening circuit of the radar system only when both this system and the direction finding system are receiving indications from a certain direction and to obtain this indication accurately without the necessity for synchronizing the motors which rotate the antennas of the systems. To this end two diphase generators 7—7' having three windings each may be connected one to each motor in such a manner that each generator rotor rotates at the same speed as the motor to which it is connected. Then, if the windings of the generators are interconnected in a manner similar to that shown in Fig. 1, a voltage having a frequency equal to the sum of the angular rotation frequencies of the two systems is generated and may be, in the embodiment shown in Fig. 1, impressed on an amplifier and shaper 8, in which the voltage is smoothed and made sinusoidal without changing its frequency. This sinusoidal voltage may be then passed through a clipper 9 which causes the voltage to become a rectangular voltage of the same frequency and then impressed on a pulser 10 which includes a differentiating circuit to differentiate the rectangular voltage and a pulsing circuit to amplify the differentiated voltage. This amplified, differentiated voltage is then impressed on a gate 11.

Similarly, a voltage obtained from the direction finding system when it is activated by a radio signal, having a frequency which is derived from the rotation frequency of that system, may be impressed on another amplifier and shaper 12. In the embodiment shown in Fig. 1 this voltage is obtained from the direction finding receiver 13 which is so connected to its antenna 3 that a sense indication is obtained from received signals in the sensor 14. This voltage may be either sinusoidal of frequency equal to the rotation frequency of the direction finding system or it may be a full-wave rectification of this sinusoid. In the embodiment used herein for illustrating the principles of the invention, the latter is the case. This full-wave rectified voltage is fed to the amplifier and shaper 12 which is so arranged that this rectified voltage is made sinusoidal and of frequency equal to the angular rotation frequency of the direction finding system and is also amplified. This sinusoidal voltage may be then passed through a clipper 14, similar to that already described, which clips the sinusoid in such a way that a rectangular voltage of the same frequency as the sinusoidal voltage is generated. This rectangular voltage is then impressed on a pulser 15 which first differentiates the rectangular voltage and then amplifies the differentiated voltage.

This amplified, differentiated voltage is then impressed on the gate 11.

The gate is so arranged that no output is obtained from the gate unless the two differentiated voltages supplied it are in substantially exact instantaneous time phase. In such a case a pulse is obtained from the gate and is impressed on the brightening circuit of the radar system 16. The radar indicator may comprise a cathode ray tube circuit providing a directional trace and including a circuit for brightening the trace in response to a given signal. Such an arrangement is clearly set forth in the patent to W. F. Hoisington, 2,426,217, dated August 26, 1947. Thus, the principle of the invention is that a brightening indication is supplied the brightening circuit of the radar system only when an output is obtained from the direction finding receiver 13 and the antennas 3 and 5 of the two systems bear a certain angular rotation position with respect to some fixed direction irrespective of the rotation speeds of the two antennas. This may be used, for example, to provide a brightening of the radar indicating apparatus only when the two antennas are directed at an object emitting signals to the direction finding system.

The amplifiers and shapers 8 and 12, the clippers 9 and 14, the pulsers 10 and 15, and the gate circuit 11 are operated by a direct voltage from a single alternating voltage source 17. The alternating voltage is rectified in rectifier 18 and applied to two separate filter sections 19 and 20. Filter section 19 supplies the operating voltages to the amplifier and shaper 12, to the clipper 14 and to the pulser 15 all acting on the 30 c. p. s. signal from the DF antenna. The filter 20 supplies operating voltages to the amplifier and shaper 8, the clipper 9, and the pulser 10, all acting on the 30.5 c. p. s., the sum of the frequencies from the DF antenna 3 and the radar antenna 5, added in the diphase generators 7—7'. The filters 19 and 20 are built separately because the two circuits otherwise tend to lock through a single filter. Either filter circuit may supply the gate circuit 11 with its operating voltage.

Fig. 3 shows a block diagram of some of the elements of the embodiment shown in Fig. 1 in which the functions of each element are illustrated by separate blocks and wave shapes are shown to indicate these functions. The diagram shows a full wave rectified voltage of 30 cycles, second from the direction finding system which corresponds to the rotation speed of 1800 R. P. M. taken as an example in Fig. 1. The amplifier and shaper 12 of Fig. 1 is broken down into a sine wave shaper 21 which causes the rectified voltage to become a sinusoid of the same frequency and an amplifier 22 which amplifies this sinusoid. These two functions may be accomplished by one double triode vacuum tube. One triode section is denoted by the label A and the other by B. The clipper 14 of Fig. 1 is shown as a negative limiter 23 which limits the negative half of the sinusoid obtained from the amplifier 22 and a square wave shaper 24 which clips the positive half of this sinusoid. Both of these functions may be accomplished by one double triode vacuum tube in which the two triode sections are shown as A and B. The rectangular wave thus obtained is then differentiated by a differentiating circuit 25 and amplified by the trigger amplifier 26. The output of these elements which together compose the pulser 15 of Fig. 1, may be a first series of positive pulses which may be again differentiated in the differentiating circuit 27 shown if the pulses are not each adequately short in time duration to obtain the required accuracy.

The series of elements effecting the series of operations performed upon the sinusoidal voltage obtained from the diphase generators 7—7' of Fig. 1 is also shown in Fig. 2 in which an input frequency of 30.5 cycles/second, corresponding to a radar antenna system rotation frequency of 30 R. P. M., is chosen as an example. The sinusoidal voltage may be shaped and amplified by one double triode vacuum tube one triode section of which, shown as A, is used as the sine wave shaper 28 and the other triode section of which, shown as B, is used as the amplifier 29. Another double triode vacuum tube is used as the clipper 9 of Fig. 1 in which one triode section, A, is used as a negative limiter 30 and the other triode section, B, is used as a square wave shaper 31. The rectangular wave thus obtained is differentiated and then amplified in a differentiating circuit 32 and trigger amplifier 33. The output of these elements, which together compose the pulser 10 of Fig. 1, may be again differentiated in the differentiating circuit 34 shown if the output of the pulser consists of a second series of positive pulses each of which is not sufficiently short in time duration to obtain the required accuracy. The gate circuit 35 provides a pulse to the radar system only when a pulse from the first series of pulses coincides in time with a pulse from the second series of pulses.

Fig. 3 shows particular circuits by which the functions of the elements mentioned in Fig. 1 and Fig. 2 may be accomplished. The amplifiers and shapers 8 and 12 of Fig. 1 are shown as similar circuits in which inductances 36 and 37, having linear phase and amplitude characteristics, are used to shape the input voltage to a sinusoidal voltage whether that input voltage is a sinusoid or a rectified sinusoid. The resistance and capacitance elements of the circuits are so chosen, according to methods well known to those skilled in the art, that a substantially pure sinusoidal voltage is shaped and amplified. The triode section 38A or 39A of each shaper and amplifier functions as a cathode follower inductively coupled to the 38B or 39B section which acts as an amplifier. The clippers 9 and 14 of Fig. 1 are shown as double triode vacuum tubes 40 and 41 biased near cutoff by a resistor 42 or 43 in the common cathode section of each tube. The function accomplished is a clipping of first the negative, then the positive half of the input sinusoidal voltage with the result that a rectangular voltage having the same frequency as the input sinusoid and substantially vertical sides is formed. This is impressed on a differentiating circuit consisting of a resistance-capacitance network 44, 45, and 46, 47 which differentiates the rectangular voltages and applies the differentiated voltage to trigger amplifiers employing, for example, pentodes 48 and 49 as the vacuum tube amplifiers. The trigger amplifiers amplify the differentiated voltages from the direction finding system and the radar system and impress them through another resistance capacitance network 50, 52, and 51, 52 to a grid of a double triode vacuum tube in the gate. The values of the elements 50, 51 and 52 may be chosen to differentiate the already differentiated and amplified rectangular waves if it is desired to cause the output pulses from the two systems to be shorter in time duration. It may be remarked that short pulses are desirable as the accuracy of the system is increased as these pulses become shorter. In some cases it may not be desirable to have very short pulses, however, and in such cases the values of the elements 50, 51 and 52 are chosen so as the combination 50, 52 and the combination 51, 52 possess time constants of considerable magnitude. The choice of the values of the elements 44, 45, 46, 47, 50, 51 and 52 is made, according to methods known to those skilled in the art, to cause the brightening indication to be supplied to the radar system for a long or short period of time depending upon the particular application of the two systems.

The gate 11, including a double triode vacuum tube 53 as shown, may be connected to a transformer 54 and a variable voltage determined by the potentiometer 55a in such a way that neither triode section of the double triode vacuum tube 53 conducts current unless a pair of positive pulses appear simultaneously on the grid of the triode which is connected to elements 50, 51 and 52. The potentiometer 55 might be used. The potentiometer 55a is adjusted until this condition obtains. Adjustment of 55a varies the bias supplied the triode sections of the double triode tube 53 and, in the preferred mode contemplated, potentiometer 55a is adjusted until the gate tube conducts no current unless simultaneous pulses appear on one of its grids. Further adjustment of this potentiometer will vary the output pulse to the radar system in time duration over limits determined by the choice of values for the elements 44, 45, 46, 47, 50, 51, and 52 as mentioned.

The function of the various elements in the circuit shown in Fig. 3 may be explained as follows:

The filter circuits which supply the operating potentials for the various tubes is itself supplied from an alternating current source. Part of the power from the source is tapped off by the turns 56 of the transformer 57 which is connected across the source and applied to the filaments of the tubes. The power tapped off by the turns 58 is applied to the filaments of the diode rectifier 59. The plates of the rectifier 59 are supplied by the transformer turns 60. The diodes are connected in parallel and positive direct voltage is taken between the filaments of rectifier 59 and a midpoint of the coil 60 which is grounded. This is applied to the two identical filter circuits consisting of coil 61 and condensers 62 and 63 for the filter for the DF circuit and coil 64 and condenser 65 and 66 for the filter of the radar circuit. Therefore positive voltages appear across resistances 67 and 68.

The input signal from the DF receiver is applied to the grid of the cathode follower 38A through a condenser 69 across a resistance 70 connected between the grid and ground. The plate supply for operating tube 38 comes from tap 71 of the DF filter. Proper grid bias is obtained for the cathode follower 38A by resistance 70 and for the amplifier 38B by resistance 72 connected between its grid and ground. Reverse feedback for stabilizing the operation is supplied each tube by the resistances 73 and 74 connected between the several cathodes and ground. Output is taken from the cathode follower 38A across the resistance 73. Because it is a degenerative amplifier it introduces negligible distortion even for an input of high voltage. The condensers 75 and 76 connected between the inductance 36 and the grid of tube 38B and ground respectively together with the inductance 36 apply the output from the cathode follower 38A to the grid of the amplifier 38B and also shape this signal so that it is a pure sinusoid. Output is taken from amplifier 38B across resistance 77 connected between the plate of tube 38B and ground through the plate supply for this tube. It is applied to the grid of the clipper tubes that follow. The circuits associated with the tube 39 function similarly and accordingly have been numbered correspondingly, 69a etc.

The output from the shaper 38 is applied to the grid of the clipper tube 40 through condenser 78 across resistance 79 which is connected between the grid of tube 40A and ground. The plate supply voltage for this tube comes through resistance 80 from the tap 81 on the resistance 67 in the output of the filter circuit for the DF circuit. Resistance 80 is a voltage dropping and decoupling resistor and condenser 82 is a shunt filter and decoupling condenser. As discussed above, each triode of the double triode tube 40 clips one side of the sinusoidal input from the shaper. The clipped output appears across resistance 83 and is tapped off therefrom. The output is differentiated as discussed above by the resistance-capacitance network 44, 45 and applied to the grid of the pentode trigger amplifier 48. The clipper employing tube 41 operates similarly and corresponding parts numbered, accordingly, 78a etc.

The pentode 48 amplifies the pulses from the differentiating circuit 44, 45 and is wired as an amplifier. The suppressor grid is connected to the cathode and the screen grid to the plate. Plate and screen grid operating voltage comes from tap 81 of the filter for the DF circuit through the plate load resistor 85a. The output from the plate of tube 48 is applied to a second differentiating circuit 50 and 52 which sharpens the pulses. The pentode 49 operates similarly and is wired similarly and the corresponding part is numbered accordingly 85a. The output from amplifier 49 is sharpened by the differentiating circuit 51, 52.

Both pulse trains are applied to the grid of triode 53A in the gate circuit. Resistor 84 connected between the grid of triode 53B and ground is a biasing resistor.

Having described the preferred embodiment of the principle of the invention, it is clear to those skilled in the art that other circuits and elements may be chosen to accomplish the same result without departing from the spirit and scope of the invention. The invention is also applicable to two radar systems rotating asynchronously in which case the source of radio signals whose direction is to be ascertained is a source of reflected signals rather than locally generated signals. Also it is applicable to two direction finding systems asynchronously rotated. The choice of vacuum tube types, rotation frequencies, particular circuits and elements has been for the purpose of illustration only is not to be construed to limit the spirit and scope of the invention except as defined by the appended claims.

What is claimed is:

1. In a system for obtaining information on the bearing of a source of radio signals, a first rotatable directive system for receiving said radio signals when said first system is aligned in a certain instantaneous angular position with respect to said source, a second rotatable directive system for receiving said radio signals when said second system is aligned in substantially the same said angular position, said first and second system being rotatable at independent rates, means for generating a signal dependent upon the relative angular positions of said systems, and means responsive to the output of one of said receiving systems and under the control of the signal of said signal generating means for providing an indication when said first and second systems are simultaneously receiving said radio signals.

2. In a system for obtaining information of the bearing of a source of radio signals, a first rotatable directive system for receiving radio signals from said source when said first system possesses a certain instantaneous angular position with respect to said source, a second rotatable directive system for receiving radio signals from said source when said second system possesses substantially the same said angular position, said first and second systems being rotatable at independent rates, means for generating a signal dependent upon the relative angular positions of said systems, and means responsive to the output of one of said receiving systems and under control of the signal from said signal generating means for providing an indication when said first and second systems are simultaneously receiving said radio signals.

3. In a system for obtaining bearing data having a first rotatable directive means arranged to receive a radio signal and to provide an output signal when said rotatable means is in a certain instantaneous angular position with respect to a source of radio signals, a second rotatable directive means and an indicator, means for rotating said second rotatable means at a rate irrespective of the rotation of said first rotatable means, means for generating a signal dependent upon the relative angular positions of said first and second rotatable means, means under the control of the signal received in said first rotatable means and under the control of the signal from said generator means for operating said indicator when said first and second rotatable means both possess a certain instantaneous angular position with respect to a fixed direction.

4. In a system for obtaining bearing data having a rotatable directive direction finding system arranged to receive a radio signal and to provide an output signal when said direction finding system is in a certain instantaneous angular position with respect to a source of radio signals and an associated rotatable directive radar system with a bearing indicator, means for rotating said radar system at a rate irrespective of the rotation of said direction finding system, a circuit for operating said indicator in response to the output signal from said first rotatable means comprising means for generating a signal dependent upon the relative angular positions of said systems and means under the control of the signal received in said direction finding system and under the control of said signal from said generator means for operating said indicator when said direction finding system and said radar system both possess a certain instantaneous angular position with respect to said source of radio signals.

5. In a system of obtaining bearing data having a direction finding system with a direction finding directive antenna, means for rotating said direction finding antenna, a receiver arranged to receive a signal from said direction finding antenna when said antenna is in a certain instantaneous angular position with respect to a source of radio signals and an associated radar system with a radar directive antenna, means to rotate said radar antenna at a rate irrespective of the rotation of said direction finding antenna, an indicator, a circuit for converting the signal received from said direction finding system into an indication on said indicator comprising means under the control of the signals received from said direction finding receiver and under the control of both said rotating means for operating said indicator to produce said indication when said antennas have substantially the same angular position with respect to said source of radio signals.

6. The improvement recited in claim 5 wherein said means for operating said indicator comprise two biased vacuum tube circuits, said bias being greater than both said controls of said means for operating said indicator individually whereby current flows in said biased vacuum tube circuits only when said direction finding antenna and said radar antenna possess substantially the same angular position.

7. In a system for obtaining bearing data having a direction finding system with a direction finding directive antenna, means for rotating said direction finding antenna, a receiver in said direction finding system, automatic means for receiving a signal from said direction finding antenna in said direction finding receiver when said antenna is in a certain instantaneous angular position with respect to a source of radio signals and an associated radar system with a radar antenna, means to rotate said radar directive antenna at a rate irrespective of the rotation of said direction finding antenna, an indicator, a circuit for converting the signal in said direction finding receiver into an indication of said indicator comprising means under the control of the signals received in said direction finding receiver and under the control of both said rotating means for operating said indicator when said antennas have a given angular position with respect to said source of radio signals.

8. The improvement recited in claim 7 wherein said means for operating said indicator comprise two biased vacuum tube circuits, said bias being greater than both said controls of said means for operating said indicator individually whereby current flows in said biased vacuum tube circuits only when said direction finding antenna and said radar antenna possess substantially the same angular position with respect to said source of radio signals.

9. In a system having a high speed rotatable direction finding system with means for supplying bearing data of a source of radio signals and an associated low speed rotatable radar system having an indicator, a circuit for converting said bearing data to a brightening indication of said indicator, means responsive to the bearing data of said direction finding system for providing a first source of voltage of frequency equal to an integral multiple of the angular rotation frequency of said high speed direction finding system, a second source of voltage of frequency equal to the sum of the angular rotation frequencies of said direction finding system and said radar system, a first amplifier connected to said first voltage source including means to cause said first voltage to become sinusoidal and of frequency equal to the angular rotation frequency of said direction finder system and to amplify said first sinusoidal voltage, a first clipper connected to said first amplifier including means to cause said first sinusoidal voltage to become a first rectangular voltage of the same frequency as said first sinusoidal voltage, a first shaping circuit connected to said first clipper including means to differentiate said first rectangular voltage and to amplify said differentiated first rectangular voltage, a second amplifier connected to said second source of voltage including means to cause said second voltage to become sinusoidal without changing the frequency of said second voltage and to amplify said second sinusoidal voltage, a second clipper connected to said second amplifier including means to cause said second sinusoidal voltage to become a second rectangular voltage of the same frequency as said second sinusoidal voltage, a second shaping circuit connected to said second clipper including means to differentiate said second rectangular voltage and to amplify said differentiated second rectangular voltage, a gate circuit connected to said first shaping circuit and to said second shaping circuit, including means to generate an output gate voltage pulse only when a peak of said differentiated first rectangular voltage occurs at the same time as a corresponding peak of said differentiated second rectangular voltage, means for applying said gate voltage pulse to the indicator of said radar system for controlling the brightness of the indication, and a direct current voltage source connected to said amplifiers, said clippers, said shaping circuits, and said gate circuit including means to decouple the voltages supplied to said amplifiers, clippers, shaping circuits and said gate circuit, whereby said gate voltage pulse is applied to the indicator of said radar system only when said rotatable direction finding system and said rotatable radar system each possess a certain instantaneous angular position with respect to said source of radio signals.

10. A circuit as recited in claim 9 wherein said first source of voltage possesses a frequency twice that of the angular rotation frequency of said direction finder system.

11. A circuit as recited in claim 9 wherein the first voltage source provides unidirectional pulses of twice the frequency of the angular rotation frequency of said direction finder system, said pulses having the shape of half a sine wave.

12. A circuit as recited in claim 9 wherein said second source of voltage comprises two diphase generators each possessing three separate electrical windings, said diphase generators being each connected to one of said systems whereby the angular frequency of rotation of each of said diphase generators is equal to the angular frequency of rotation of each of said systems to which it is connected.

13. A circuit as recited in claim 9 wherein each of said means to cause said voltages to become sinusoidal include vacuum tube amplifiers connected between one of the sources of voltage and one of the clippers, and low-pass filters connected between said amplifiers.

14. A circuit as recited in claim 9 wherein each of said amplifier means to cause said voltages to become sinusoidal include amplifiers connected between one of the sources of voltage and one of the clippers and low-pass filters connected between said amplifiers, each low-pass filter comprising condensers connected across the input of one of said amplifiers and an inductance possessing substantially linear amplitude and phase characteristics connected between the output of one of said amplifiers and a point between said condensers.

15. A circuit as recited in claim 9 wherein each of said clipper means to cause said sinusoidal voltages to become rectangular comprises biased vacuum tube amplifiers connected between the output of said first or said second amplifier and the input of one of said pulsers.

16. A circuit as recited in claim 9 wherein each of said means to differentiate said rectangular voltages comprises, a resistance and a capacitance, said resistance being connected across the input of said means to amplify said differentiated rectangular voltages and said capacitance being connected between the output of one of the clippers and the input of said means to amplify said differentiated rectangular voltages and wherein each of said means to amplify said differentiated rectangular voltages comprises a vacuum tube amplifier connected between said capacitance and the gate circuit.

17. A circuit as recited in claim 9 wherein said gate circuit comprises two biased vacuum tube circuits said bias being greater than said differentiated voltages individually whereby current flows in said biased vacuum tube circuits only when said differentiated peaks occur at the same time.

18. A circuit as recited in claim 9 wherein said means to decouple the voltages includes a plurality of separate filter circuits connected to said direct current voltage source and to said amplifiers, said clippers, said shaping circuits, and said gate circuit.

19. A circuit as recited in claim 9 wherein said gate circuit comprises two vacuum tube circuits and means to bias the vacuum tubes of said circuits, said bias being greater than said differentiated voltages individually whereby said direction finding system and said radar system each possess a substantially identical angular position with respect to said source of signals when said gate circuit pulse is applied to said indicator of said radar system.

20. A circuit as recited in claim 9 wherein said first source of voltage is a receiver in said direction finding system.

21. An arrangement for indicating direction finding bearings obtained by a first directive rotating antenna system on an indicator used for displaying radar signals received by a second directive rotating antenna system comprising means for deriving first signals representative of the directional position of a remote object at the rate of said first antenna system rotation, means for deriving second signals representative of the combined rates of rotation of said first and second antenna systems, means for combining said first and second signals to derive a third signal representative of coincidence in time of said first and second signal occurrence and means for applying said third signal to said indicator.

ARBOR GORDON EVERHART.

REFERENCES CITED

The following references are of record in the file of this patent:

UNITED STATES PATENTS

| Number | Name | Date |
| --- | --- | --- |
| 2,419,239 | White | Apr. 22, 1947 |
| 2,420,334 | White | May 13, 1947 |
| 2,420,408 | Behn | May 13, 1947 |
| 2,440,250 | Deloraine | Apr. 27, 1948 |
| 2,449,977 | Busignies | Sept. 28, 1948 |
| 2,457,396 | Pollard | Dec. 28, 1948 |